S. E. HARPHAM.
INCUBATOR.
APPLICATION FILED JULY 6, 1917.
1,276,907.
Patented Aug. 27, 1918.
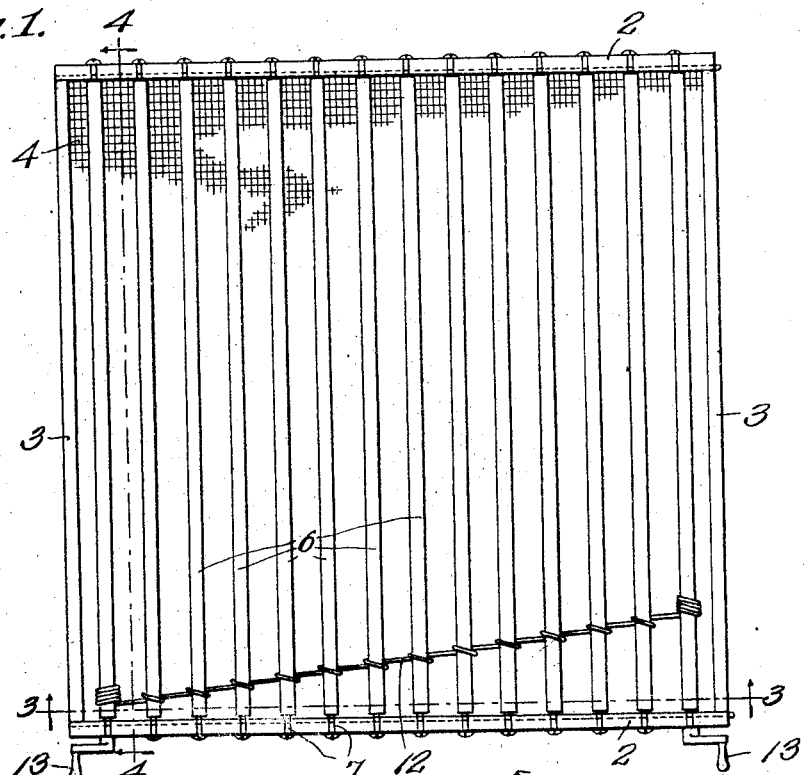
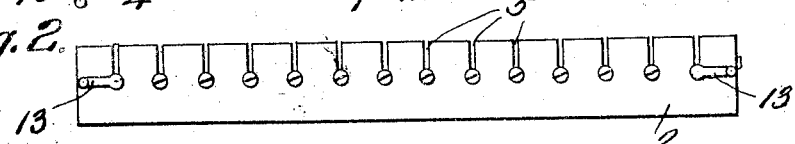
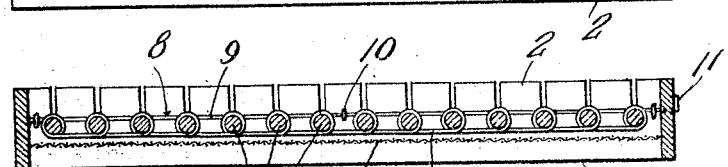
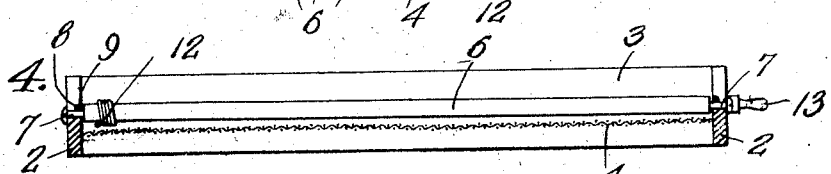
WITNESSES
James F. Crown,
S. M. McColl,
INVENTOR
Samuel E. Harpham,
BY Richard B. Owen,
ATTORNEY.

UNITED STATES PATENT OFFICE.

SAMUEL E. HARPHAM, OF HEARTWELL, NEBRASKA.

INCUBATOR.

1,276,907.

Specification of Letters Patent.  Patented Aug. 27, 1918.

Application filed July 6, 1917. Serial No. 178,950.

*To all whom it may concern:*

Be it known that I, SAMUEL E. HARPHAM, a citizen of the United States, residing at Heartwell, in the county of Kearney and State of Nebraska, have invented certain new and useful Improvements in Incubators, of which the following is a specification.

This invention relates to incubators, and more particularly to trays therefor.

The principal object of the invention is to provide a simple and efficient incubator tray so constructed that all of the eggs may turned simultaneously by a single operation.

Another object is to provide a tray of this character with rotatably mounted, removable egg supporting rollers and means for holding the rollers against vertical movement, while being turned.

Another object is to provide a simple and easily operated means for simultaneously rotating the rollers.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a plan view of an incubator tray constructed in accordance with this invention.

Fig. 2 is an end elevation thereof.

Fig. 3 is a transverse section taken on the line 3—3 of Fig. 1.

Fig. 4 is a longitudinal section taken on the line 4—4 of Fig. 1.

In the embodiment illustrated, a tray 1 is shown which may be of any suitable or desired size or shape according to the incubator in connection with which it is to be used, it being here shown rectangular. This tray is composed of end members 2 connected by side members 3, said members being constructed of wooden strips or bars about one and a half inches wide more or less, and a foraminous bottom 4 is secured to the lower edges of said members. This bottom is preferably constructed from screen wire, although it may be composed of any other suitable foraminous material through which the heat may pass for circulation around the eggs. The end members 2 are provided with a plurality of longitudinally spaced notches 5 here shown in the form of slots, those in one end member being arranged diametrically opposite those in the other end member, and which are to perform the function of bearings for journals 7, formed at the ends of rollers 6.

These rollers 6 which are preferably constructed of wood or similar material are designed to support the eggs to be incubated, and any desired number thereof may be employed, fourteen being here shown. The journals 7 of these rollers 6 are here shown in the form of screws, inserted in the ends of the rollers with heads thereof arranged on the outer faces of the end members 2, the shanks or body portions of the screws being inserted in the bearings formed by the slots 5 as is shown clearly in Figs. 1 and 2, sufficient space being left between the ends of the rollers, and the adjacent end walls to permit the free turning of said rollers.

The end members 2 are each provided on their inner faces above the seats in which the journals 7 are disposed with a longitudinally extending groove 8 in which is designed to be disposed a wire rod 9 which is arranged over the journals 7 and designed to hold them against rising when the rollers are turned. These wires 9 are held in position and guided by means of loops or eyes 10, said eyes preferably being formed by driving small staples in the end members with their legs spanning the grooves 8 as is shown clearly in Fig. 3. Each wire rod 9 is preferably provided at one end with a laterally extending finger 11 to facilitate its insertion and removal, it being obvious that this wire must be removed before the rollers can be taken out, and which is necessary for the purpose to be hereinafter described.

A flexible element 12 in the form of a cord is wound around and connects the rollers 6, the ends of said cord being wound several times around each end roller, and once around the intermediate rollers as is shown clearly in Fig. 1. The cord passes below the rollers and is wound upwardly around them from right to left. This cord is also wrapped around the rollers and is positioned at an angle from one side to the other of the tray as is shown clearly in Fig. 1 to prevent binding thereof when the rollers are being turned.

The journals at one end of the two end rollers are preferably made angular to receive crank handles 13 which are designed for turning the rollers. By positioning one of these crank handles at each side of the tray, the rollers may be turned and the eggs supported thereby rolled either way from either end of the tray, thereby facilitating the turning operation.

From the above description, it will be understood, that when it is desired to turn the eggs all that is necessary is to grasp one of the crank handles 13, and turn it, which turns the roller with which it is connected, and through the flexible element 12 simultaneously turns all of the rollers and thereby rolls the eggs from one side to the other which is necessary to insure a reliable hatch. It will also be seen, that by positioning the wire rods 9 above the roller journals, the end rollers will be prevented from rising when they are turned and also the intermediate rollers will be held in their proper position thereby.

On the eighteenth day, when the eggs are turned for the last time, the wire rods 9 are withdrawn from the tray by moving them longitudinally out of the guide loops 10, and the rollers may then be taken out, and the eggs dropped down on to the screen bottom 4 where they will remain until the chicks come out.

It will thus be seen that this tray, while simple and cheap in construction is very efficient in operation and that by a single turning of a crank handle all of the eggs contained in the tray may be simultaneously turned, thereby greatly lessening the labor usually incident to such turning.

From the foregoing description, taken in connection with the accompanying drawing, the advantages of the construction and of the method of operation will readily be apparent to those skilled in the art to which the invention appertains and while I have described the principle of operation of the invention, together with the device which I now consider to be the best embodiment thereof, I desire to have it understood that the device shown is merely illustrative and that such changes may be made as are within the scope of the claimed invention.

I claim:

An incubator tray including opposed upright members having a plurality of longitudinally spaced notches in their upper edges and a groove arranged loosely on the inner face of each of said members above the bottoms of said notches, rollers having their ends journaled in said notches, a wire rod positioned in each of said grooves, means for retaining each rod in said grooves, and permitting it to slide longitudinally, the two end rollers having one of their journals made angular to receive a crank handle, and a flexible element wound around said rollers and inclined from one end roller to the other.

In testimony whereof I affix my signature in presence of two witnesses.

SAMUEL E. HARPHAM.

Witnesses:
WALTER M. CROW,
M. R. EMBERSON.